W. R. GARDNER.
SPRING WHEEL.
APPLICATION FILED OCT. 26, 1908.
955,258. Patented Apr. 19, 1910.
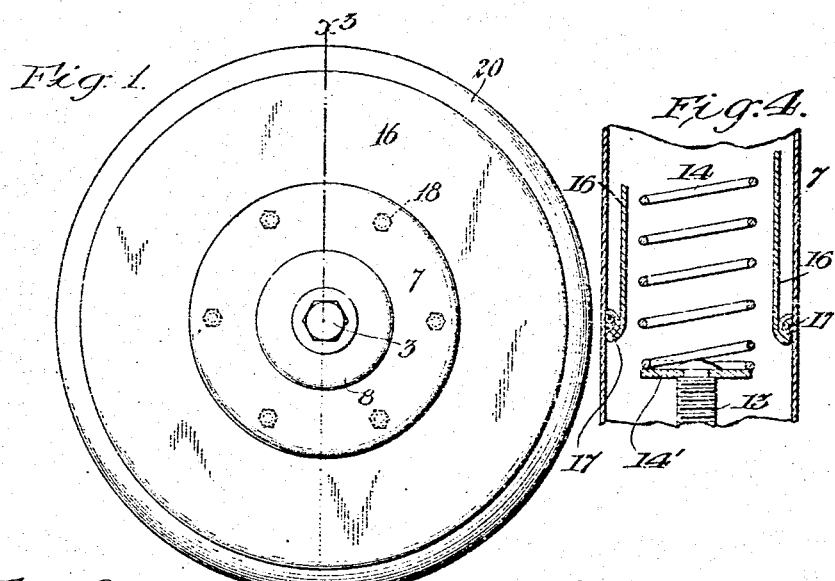
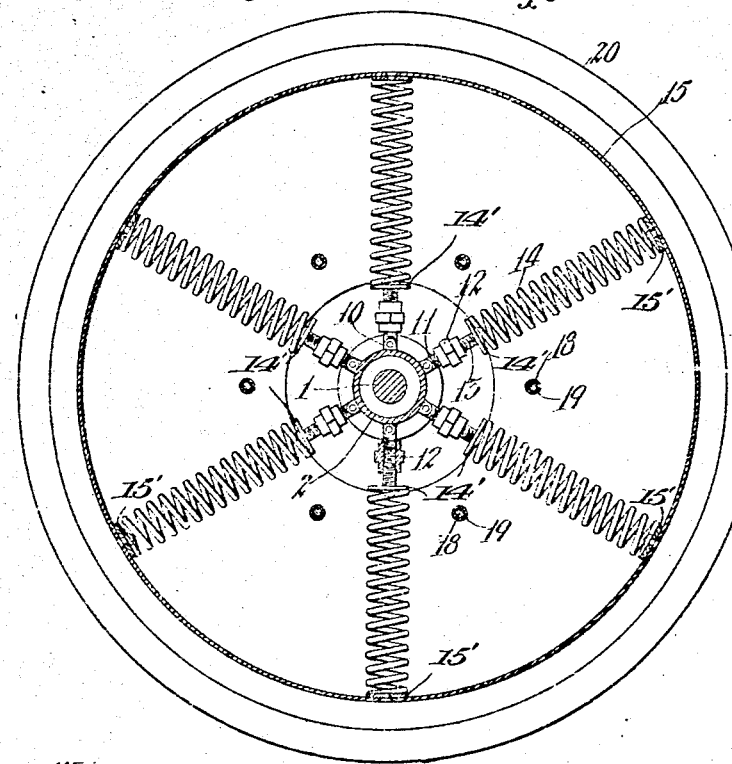
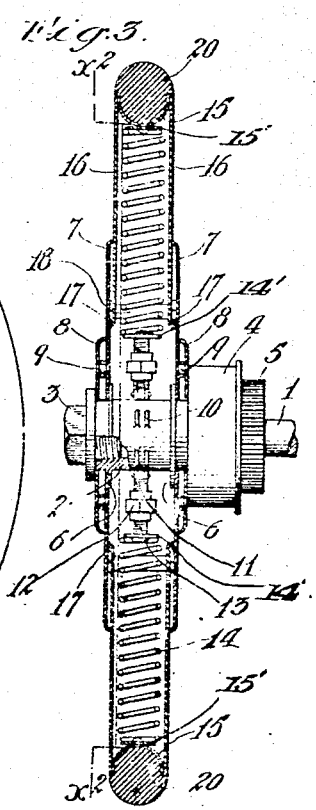
Witnesses:
Louise Gratz
Frank L. Abraham
Inventor
William R. Gardner
by Townsend & Hackley
attys.

UNITED STATES PATENT OFFICE.

WILLIAM R. GARDNER, OF LOS ANGELES, CALIFORNIA, ASSIGNOR TO GARDNER AUTO SPRING WHEEL COMPANY, OF LOS ANGELES, CALIFORNIA, A CORPORATION OF CALIFORNIA.

SPRING-WHEEL.

955,258.   Specification of Letters Patent.   Patented Apr. 19, 1910.

Application filed October 26, 1908. Serial No. 459,632.

*To all whom it may concern:*

Be it known that I, WILLIAM R. GARDNER, a citizen of the United States, residing at Los Angeles, in the county of Los Angeles and State of California, have invented a new and useful Spring-Wheel, of which the following is a specification.

This invention relates to spring wheels, and the main object of the invention is to so construct the wheel that its rim is resiliently supported with respect to its hub, so that in operation shock to the hub of the wheel is avoided.

A further object of the invention is to inclose the spring mechanism of the wheel and thus prevent possibility of damage thereto.

Another object is to provide means for regulating the tension of the springs, so that the wheel may be adjusted for giving the proper support for various weights of vehicles or loads. Thus, if the wheel is to be used on a heavy vehicle, which is to carry heavy loads, the tension of the springs may be increased to give the necessary supporting resistance, while if the wheel is to be used on a light vehicle, adapted for carrying light loads, the tension of the springs may be decreased so that the maximum degree of resiliency is afforded, and at the same time securing the required amount of sustaining power.

Another object is to firmly support the rim portion of the wheel in such a manner that it may move radially with respect to the hub, but is prevented from any lateral or twisting motion with respect to the regular plane of movement which is at right angles to the axis of the hub.

Referring to the drawings:—Figure 1 is a side elevation of the wheel. Fig. 2 is a vertical cross section through the wheel taken on line $x^2$—$x^2$ Fig. 3. Fig. 3 is an enlarged cross section on line $x^3$—$x^3$, Fig. 1. Fig. 4 is an enlarged view of a part of Fig. 3, showing the manner of securing the inner ends of the springs and the parts adjacent thereto.

The wheel is especially designed for automobiles, and obviously may be used on other vehicles if desired, and the wheel is so constructed that it may be operated either as one of the idle wheels of the automobile, or it may serve as one of the driving wheels.

1 designates a portion of the axle of the vehicle upon which the wheel is mounted.

The hub of the wheel comprises a barrel 2 mounted on the axle 1 and having its outer end internally screw threaded to receive a nut 3. As the wheel shown is to be used as one of the driving wheels of the automobile, the hub 2 is equipped with a brake-drum 4 and gear 5. If the wheel is not to be used as a driving wheel, but merely as an idle wheel, the gear 5 may be omitted, and obviously the brake-drum 4 may or may not be used, according as to whether it is desired to apply the brake to the wheel or not.

The hub 2 is provided with two flanges 6 against the outer sides of which two intermediate plates 7 rest, each plate 7 being in the form of a disk and having its rim dished inwardly, as shown. A pair of center plates 8, which are similar in construction to the plates 7, but of smaller diameter, bear against the outer faces of the plates 7, and are rigidly secured thereto by means of rivets 9. The outer plate 8 is also retained by the flanged head of the nut 3, and the inner plate 8 rests against the brake-drum 4.

The hub 2 is provided with six pairs of lugs 10, and pivoted to each pair of lugs 10 is a threaded bolt 11 which is connected by a screw coupling 12 with a reversely threaded bolt 13, the latter being connected by a coil tension spring 14 with a rim 15. The springs 14 are welded at their outer ends to plates 15′ and at their inner ends to plates 14′. The inner plate 14′ of each spring is secured to the end of a bolt 13 by upsetting the head of the bolt on the plate. The outer plate 15′ of each spring is riveted to the rim 15. I have shown six springs 14, but it is obvious that more or less of these could be employed, if desired. Two outer plates 16 are secured to the rim 15 and extend inside of the intermediate plate 7, the inner portions of the plates 16 being curved outwardly and provided with packing 17. The two plates 16 are also secured together by bolts 18 and are spaced apart by spacing sleeves 19 which encircle the bolts 18. As shown in Fig. 2, the bolts 18 are arranged centrally between the springs 14 so that the action of the springs is not interfered with. The rim 15 may be equipped with any form of tire desired, such, for example, as the solid tire 20 shown.

In operation, the load is carried by the uppermost springs which are brought under tension, each spring being gradually placed under a tension as the spring moves into a position at the upper part of the wheel as the wheel revolves, while as the spring passes toward the lower part of the wheel the tension on it is gradually reduced. Upon striking an obstruction, the rim will be suddenly moved upward thereby further increasing the tension of the upper springs until their tension is sufficient to lift the load or the wheel rolls off from the obstruction, whereupon the upper springs again regain their normal load sustaining tension, and thus shocks to the hub of the wheel and to the load are avoided.

When the wheel is operated as a driving wheel, the necessary rotation is imparted from the hub to the rim through the medium of the springs, and thus during such use of the wheel the hub may turn relatively to the wheel a certain amount until the springs are under a tension sufficient to transmit the driving power to the rim. Obviously, under such conditions all of the springs will be placed under a greater tension, and at the same time the uppermost springs will still have the greater tension owing to their weight sustaining function. When the wheel is used as a driving wheel in this manner, the springs also act to absorb shocks which would otherwise be imparted to the vehicle owing to sudden variations in the driving power, and a further advantage is that the engine and transmission mechanism is also relieved from sudden reactive shocks, caused, for example, by striking obstructions in the road, and the operation of the engine is thereby rendered more uniform as these sudden changes in the load are thus placed on the engine more gradually.

The outer plates 16 will obviously slide with respect to the intermediate plate 7, and the outer rims of the plates 7, being inturned and bearing against plates 16, prevent the entrance of sand, water or foreign substance to the interior. Any slight amount of moisture or dust which might work past the outer rim of plates 7, however, is arrested by the packing 17, so that the interior of the wheel is practically moisture and dust proof.

What I claim is:

A spring wheel, comprising a hub, a pair of flanges on the hub, a pair of intermediate plates resting against said flanges, the rim of said plates being dished inwardly, a pair of reinforcing inner plates, the rim of said plates being dished inwardly abutting against said intermediate plates, bolts with spacing sleeves connecting the reinforcing inner plates and the intermediate plates together, a pair of outer plates slidably arranged between the intermediate plates, the inner rim of said outer plates being dished outwardly and abutting against the intermediate plates, thereby forming an annular chamber between each pair of outer and intermediate plates, a gasket within each of said chambers, a rim supported by the outer plates, bolts with spacing sleeves connecting the outer plates together, and a series of coil tension springs secured to the rim and connected to said hub.

In testimony whereof, I have hereunto set my hand at Los Angeles, California, this 1st day of October 1908.

WILLIAM R. GARDNER.

In presence of—
G. T. HACKLEY,
FRANK L. A. GRAHAM.